United States Patent
Natori

(10) Patent No.: US 8,294,945 B2
(45) Date of Patent: Oct. 23, 2012

(54) DEFACEMENT DEGREE DETERMINATION APPARATUS AND DEFACEMENT DEGREE DETERMINATION METHOD

(75) Inventor: Naotake Natori, Kunitachi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 884 days.

(21) Appl. No.: 12/365,485

(22) Filed: Feb. 4, 2009

(65) Prior Publication Data

US 2009/0201555 A1    Aug. 13, 2009

(30) Foreign Application Priority Data

Feb. 8, 2008   (JP) .................................. 2008-029612
Dec. 19, 2008  (JP) .................................. 2008-324331

(51) Int. Cl.
 *G06K 15/00* (2006.01)
 *B41F 1/34* (2006.01)
 *B41F 21/12* (2006.01)
(52) U.S. Cl. ...................... 358/1.18; 358/1.12; 101/485
(58) Field of Classification Search ................. None
 See application file for complete search history.

(56) References Cited

U.S. PATENT DOCUMENTS

| | | | | |
|---|---|---|---|---|
| 6,305,284 | B1 * | 10/2001 | Watanabe et al. | 101/463.1 |
| 6,993,190 | B1 * | 1/2006 | Nguyen | 382/199 |
| 2001/0011507 | A1 * | 8/2001 | Korem | 101/217 |
| 2003/0090750 | A1 * | 5/2003 | Takahashi | 358/516 |
| 2003/0197877 | A1 * | 10/2003 | Lee | 358/1.9 |
| 2005/0115430 | A1 * | 6/2005 | Cummings | 101/485 |
| 2005/0226498 | A1 * | 10/2005 | Lee | 382/162 |
| 2006/0033962 | A1 * | 2/2006 | Matsunoshita et al. | 358/3.28 |

FOREIGN PATENT DOCUMENTS

| | | |
|---|---|---|
| JP | 56-081439 | 7/1981 |
| JP | 62-200248 | 9/1987 |
| JP | 02-175155 | 7/1990 |
| JP | 03-214363 | 9/1991 |
| JP | 05-118819 | 5/1993 |
| JP | 05-162294 | 6/1993 |
| JP | 07-021380 | 1/1995 |
| JP | 07-089063 | 4/1995 |
| JP | 07-248453 | 9/1995 |
| JP | 08-035818 | 2/1996 |
| JP | 2000-062299 | 2/2000 |
| JP | 2000-249658 | 9/2000 |
| JP | 2005-091330 | 4/2005 |
| JP | 2006-088562 | 4/2006 |
| JP | 2007-042292 | 2/2007 |

OTHER PUBLICATIONS

Japanese Office Action dated Jul. 3, 2012.

* cited by examiner

*Primary Examiner* — Ming Hon
(74) *Attorney, Agent, or Firm* — Pillsbury Winthrop Shaw Pittman, LLP

(57) ABSTRACT

A defacement degree determination apparatus according to one embodiment of the invention includes an alignment unit which aligns positions of an input image from one printed material printed using a plurality of printing plates with registered images registered in advance, a plate separation processing unit which separates the input image into a plurality of printed components corresponding to the plurality of printing plates, and extracts defacement features from the respective printed components, and a defacement degree determination unit which determines a defacement degree of the printed material based on the defacement features extracted from the respective printed components.

8 Claims, 11 Drawing Sheets

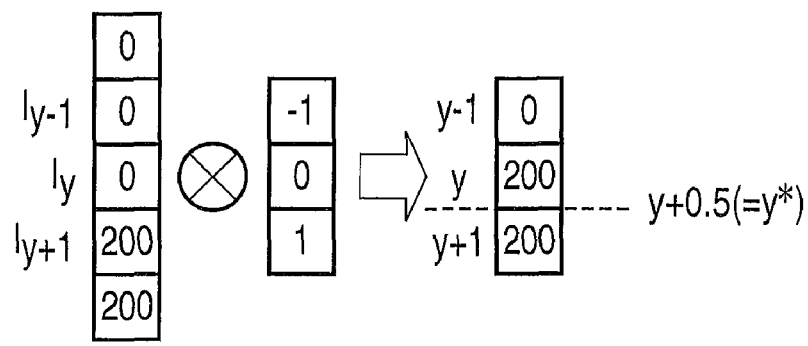
F I G. 4 A
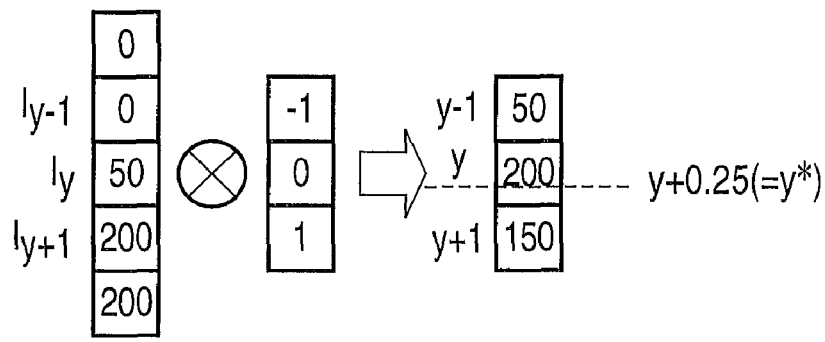
F I G. 4 B
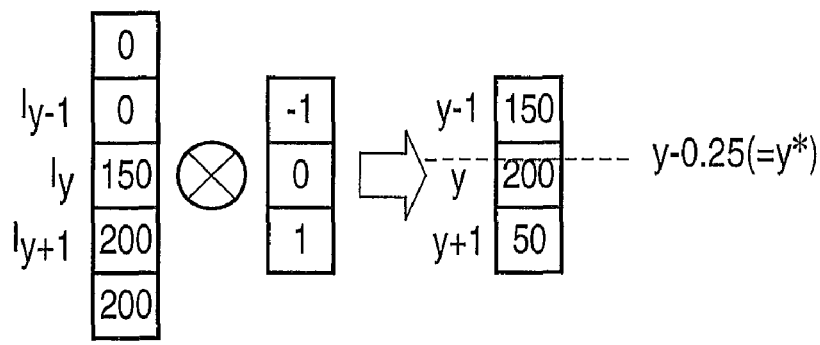
F I G. 4 C

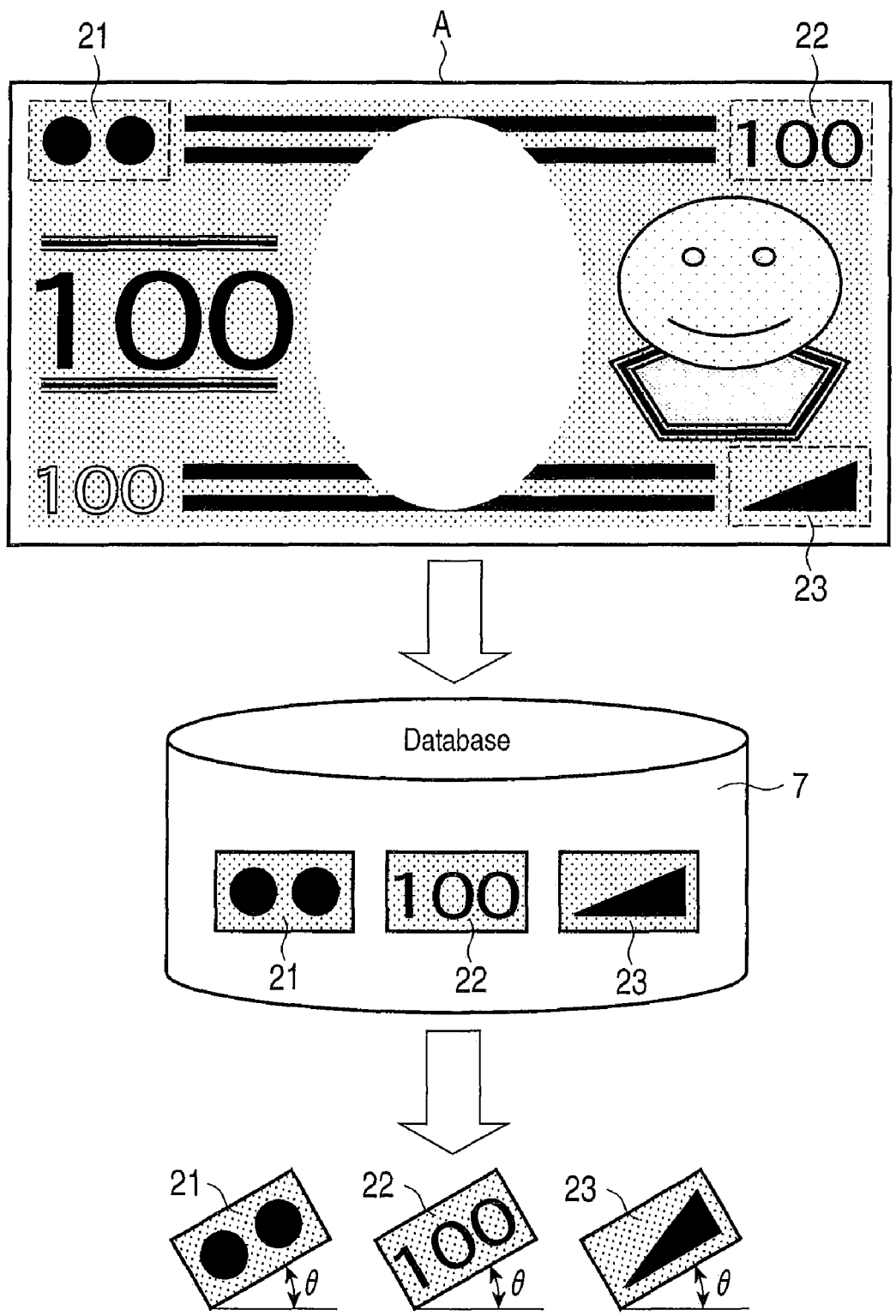
F I G. 6

DEFACEMENT DEGREE DETERMINATION APPARATUS AND DEFACEMENT DEGREE DETERMINATION METHOD

CROSS-REFERENCE TO RELATED APPLICATIONS

This application is based upon and claims the benefit of priority from prior Japanese Patent Applications No. 2008-029612, filed Feb. 8, 2008; and No. 2008-324331, filed Dec. 19, 2008, the entire contents of both of which are incorporated herein by reference.

BACKGROUND OF THE INVENTION

1. Field of the Invention

One embodiment of the invention relates to a defacement degree determination apparatus and defacement degree determination method, which determine, for example, a defacement degree of the surface of a printed material such as securities based on a two-dimensional image of the printed material.

2. Description of the Related Art

In recent years, a demand for determining a defacement degree of a printed material based on a two-dimensional image of the printed material obtained by image input means such as a camera or scanner is increasing, and many methods of defacement degree determination by executing arithmetic processing of sampling values from images have been proposed. For example, a method of determining a defacement degree based on the average or variance of density values sampled from a printed part of a printed material, a method of making similar determination conversely from a non-printed part of a printed material, or a method of combining these methods is available.

Jpn. Pat. Appln. KOKAI Publication No. 2000-62299 discloses a technique associated with such defacement degree determination of a printed material. With the disclosed technique, a printed material is aligned based on an image of the printed material. Defacement degree determination values are calculated by executing arithmetic (integration) processing, based on at least two or more pieces of region information which are stored in advance, from values obtained by normalizing the differences between the obtained density average values and a predetermined standard value by a standard deviation, the areas of the regions, and visual characteristic coefficients of the regions (coefficients corresponding to different defacement degrees that one feels for a light printed region and dark printed region). Then, a final defacement degree is calculated by aggregating them, and the defacement degree is determined using a threshold.

Note that the region information is obtained by applying threshold processing for each print type (light or dark) based on the average value of a plurality of image data, but it is based only on the density. Alignment and rotation correction of an image are based on a known method. Furthermore, as for aggregation of the defacement degree determination values, only a method by means of simple arithmetic operations (additions) is disclosed.

In the aforementioned related art, a practical problem is the alignment precision. Conventionally, the edge (a position where the density changes largely) of a printed material is detected using a technique like a differential filter, and alignment is done with reference to that edge. However, a sufficiently high precision cannot often be obtained due to deficiency or deformation of the edge part.

A material printed using a plurality of printing plates includes a plurality of printed components corresponding to these printing plates. For this reason, due to the influence of relative positional variations of these printing plates, the plurality of printed components may also suffer relative positional variations. The aforementioned related art does not consider such positional variations.

Furthermore, the resolution of image input means has limitations of principle. Even for an identical printed material, the positions of input images vary due to slight positional deviations of a pixel pitch or less when an image is input a plurality of times. However, since the related art cannot attain alignment to a precision exceeding the pixel pitch, it cannot follow up such variations.

For some reasons described above, sampling values from images unwantedly become unstable in the related art.

The way defacement of a printed material advances is closely related to the nature of a printing plate. For example, in case of an intaglio plate (intaglio printing plate), since the density of printing is expressed by the thickness of ink (a printed part is dark if the ink is thick; it is light if the ink is thin), the ink of a dark part is shaved as the defacement advances, and the contrast becomes low in general.

On the other hand, in case of a planographic plate (planographic printing plate), the ink is rarely shaved as the defacement advances, and color tone changes due to adhesion of dirt or aging of the printed surface. In this manner, in order to detect a change of the printed surface that appears as the defacement advances, a sampling method suited to each printing plate should be selected. However, in the related art, although regions for respective print types are defined, sampling values from images are only densities, and the defacement of a printed material cannot be precisely detected.

Furthermore, rotation correction of an image as a previous step of alignment is based on a known method as in alignment, and rotation correction with a sufficiently high precision cannot often be done for the same reasons as those described for the alignment.

BRIEF SUMMARY OF THE INVENTION

It is an object of the invention to provide a defacement degree determination apparatus and defacement degree determination method, which can execute processes suited to respective printed components by separating a printed pattern of a printed material into printed components for respective printing plates, and can determine a defacement degree more precisely.

A defacement degree determination apparatus according to one embodiment of the invention comprises: a alignment unit configured to align positions of an input image from one printed material printed using a plurality of printing plates with registered images registered in advance; a plate separation processing unit configured to separate the input image into a plurality of printed components corresponding to the plurality of printing plates, and extract defacement features from the respective printed components; and a defacement degree determination unit configured to determine a defacement degree of the printed material based on the defacement features extracted from the respective printed components.

A defacement degree determination method according to one embodiment of the invention comprises: aligning positions of an input image from one printed material printed using a plurality of printing plates with registered images registered in advance; separating the input image into a plurality of printed components corresponding to the plurality of printing plates, and extracting defacement features from the respective printed components; and determining a defacement degree of the printed material based on the defacement features extracted from the respective printed components.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 4A to 4C are views for explaining other examples of estimation of a true edge position in an edge true position estimation unit;

FIG. 6 is a view for explaining target rotation conversion in a target rotation conversion unit;

DETAILED DESCRIPTION OF THE INVENTION

Figure 1:
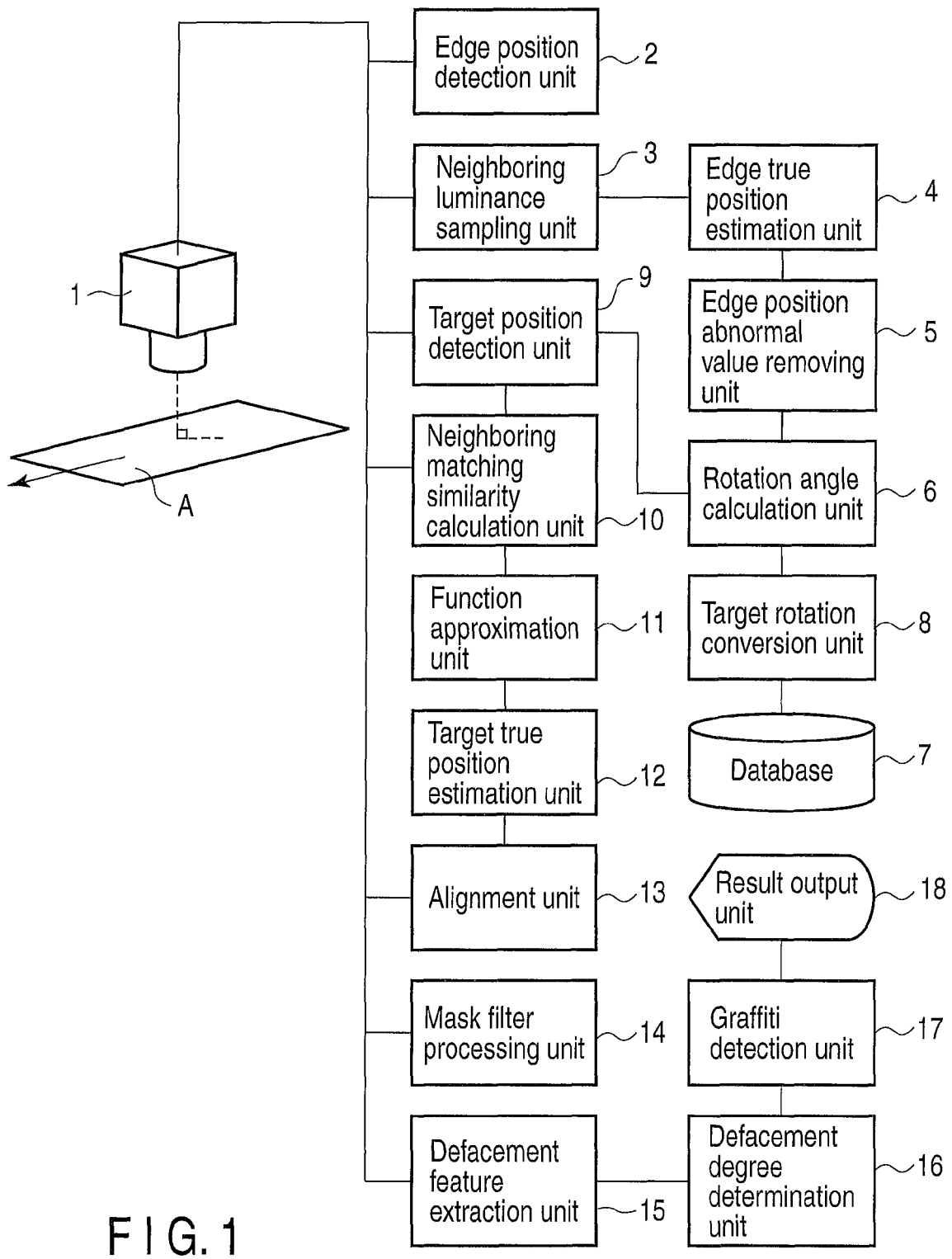
FIG. 1 is a schematic block diagram showing the arrangement of a defacement degree determination apparatus of a printed material according to the first embodiment of the invention.

The first and second embodiments of the invention will be described hereinafter with reference to the drawings.

The first embodiment of the invention will be described first with reference to the drawing.

FIG. 1 schematically shows the arrangement of a defacement degree determination apparatus of a printed material according to the first embodiment of the invention. This defacement degree determination apparatus of a printed material includes an image input unit 1, an edge position detection unit 2, a neighboring luminance sampling unit 3, an edge true position estimation unit 4, an edge position abnormal value removing unit 5, a rotation angle calculation unit 6, a database 7, a target rotation conversion unit 8, a target position detection unit 9, a neighboring matching similarity calculation unit 10, a function approximation unit 11, a target true position estimation unit 12, an alignment unit 13, a mask filter processing unit 14, a defacement feature extraction unit 15, a defacement degree determination unit 16, a graffiti detection unit 17, and a result output unit (display unit) 18.

The image input unit 1 inputs an image of the surface of a printed material (for example, a security such as a banknote) A conveyed on a convey path in the direction of an arrow. The edge position detection unit 2 detects a position of an edge of a printed material A based on a luminance difference between pixels on the image input by this image input unit 1. The neighboring luminance sampling unit 3 samples luminance values at neighboring positions of the edge position (those of a plurality of pixels including the edge position) detected by this edge position detection unit 2.

The edge true position estimation unit 4 calculates a true edge based on the edge position detected by the edge position detection unit 2 and a gradient of the luminance values at neighboring positions of the that edge position, which are sampled by the neighboring luminance sampling unit 3. The edge position abnormal value removing unit 5 detects a true edge position indicating an abnormal value from a sequence of true edge positions calculated by this edge true position estimation unit 4, and removes this true edge position indicating the abnormal value.

The rotation angle calculation unit 6 calculates a rotation angle of the printed material A (that with respect to a reference position) based on the sequence of the plurality of true edge positions that do not include any true edge position indicating the abnormal value removed by the edge position abnormal value removing unit 5. The target rotation conversion unit 8 applies rotation conversion to a plurality of printed patterns (to be referred to as targets hereinafter) registered in advance in the database (storage unit) 7 in correspondence with respective printing plates of the printed material A in accordance with the rotation angle calculated by the rotation angle calculation unit 6. The target position detection unit 9 detects positions where matching similarities become maximum in the image input by the image input unit 1 in association with the targets that have undergone the rotation conversion by the target rotation conversion units 8 in correspondence with the respective printing plates of the printed material A.

The neighboring matching similarity calculation unit 10 calculates matching similarities (a plurality of matching similarities with a plurality of neighboring positions that neighbor each matching similarity maximum position) near the matching similarity maximum positions detected for the respective targets by the target position detection unit 9. The function approximation unit 11 applies function approximation using a curve or curved surface to gradients of matching similarities at the matching similarity maximum positions for the respective targets detected by the target position detection unit 9 and at neighboring positions of the matching similarity maximum positions calculated by the neighboring matching similarity calculation unit 10 in correspondence with the respective printing plates of the printed material A.

The target true position estimation unit 12 determines true positions by calculating positions that yield maximal values of the function for the respective targets that have undergone the function approximation by the function approximation unit 11 in correspondence with the respective printing plates of the printed material A. The alignment unit 13 aligns the image input by the image input unit 1 and dictionary information registered in advance based on the plurality of true positions of the targets calculated by the target true position estimation unit 12 in correspondence with the respective printing plates of the printed material A.

The mask filter processing unit 14 separates printed components of the corresponding plates from the image aligned by the alignment unit 13 using mask filters registered in advance for the respective printing plates of the printed material A. For example, the mask filter processing unit 14 separates the image into a first printed component corresponding to a first printing plate and a second printed component corresponding to a second printing plate using a first mask filter corresponding to the first printing plate (intaglio plate) and a second mask filter corresponding to the second printing plate (planographic plate).

The defacement feature extraction unit 15 extracts a contrast as a defacement feature from the first printed component separated by this mask filter processing unit 14, and color tone as a defacement feature from the second printed component. The defacement degree determination unit 16 determines defacement degrees of the printed material A based on the defacement features for the respective printing plates extracted by this defacement feature extraction unit 15. Note that the defacement degree determination unit 16 can determine the defacement degree of the printed material A by integrating the defacement features for the respective printing plates extracted by this defacement feature extraction unit 15.

The graffiti detection unit 17 detects graffiti (handwritten) with respect to a specific part including at least one of a portrait and face value from the first printed component separated by the mask filter processing unit 14. The result output unit (display unit) 18 outputs the detection result of this graffiti detection unit 17 and the determination result of the defacement degree determination unit 16.

The respective units will be described in detail below.

The image input unit 1 includes an image sensing device such as a camera or image scanner, thereby acquiring a two-dimensional image M of the printed material A. Assume that the printed material A faces front with respect to the image input unit 1, and a distortion in the depth direction is negligible.

The edge position detection unit 2 detects the positions of edges of the printed material A using luminance differences between pixels on the image (to be also referred to as an input image hereinafter) M input by the image input unit 1. In this embodiment, the edge positions are detected using, for example, a one-dimensional differential filter.

Figure 2:
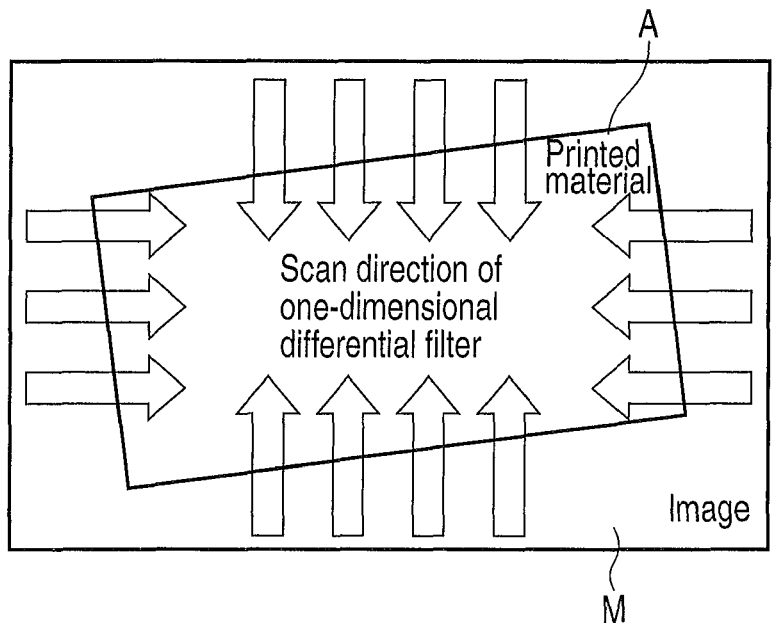
FIG. 2 is a view for explaining the scan directions of a one-dimensional differential filter in an edge position detection unit.

FIG. 2 is an explanatory view of the scan directions of the one-dimensional differential filter in the edge position detection unit 2. The one-dimensional differential filter executes filtering processing using an operator "−1 0 1" in a direction nearly perpendicular to the edge of the printed material A from the end of the image for a certain line, and determines a position where the arithmetic result of the operator is equal to or larger than (or equal to or smaller than) a predetermined threshold TH as an edge position in that line. Let y be that position, and $I_y$ be a luminance value at the position y.

Figure 3:
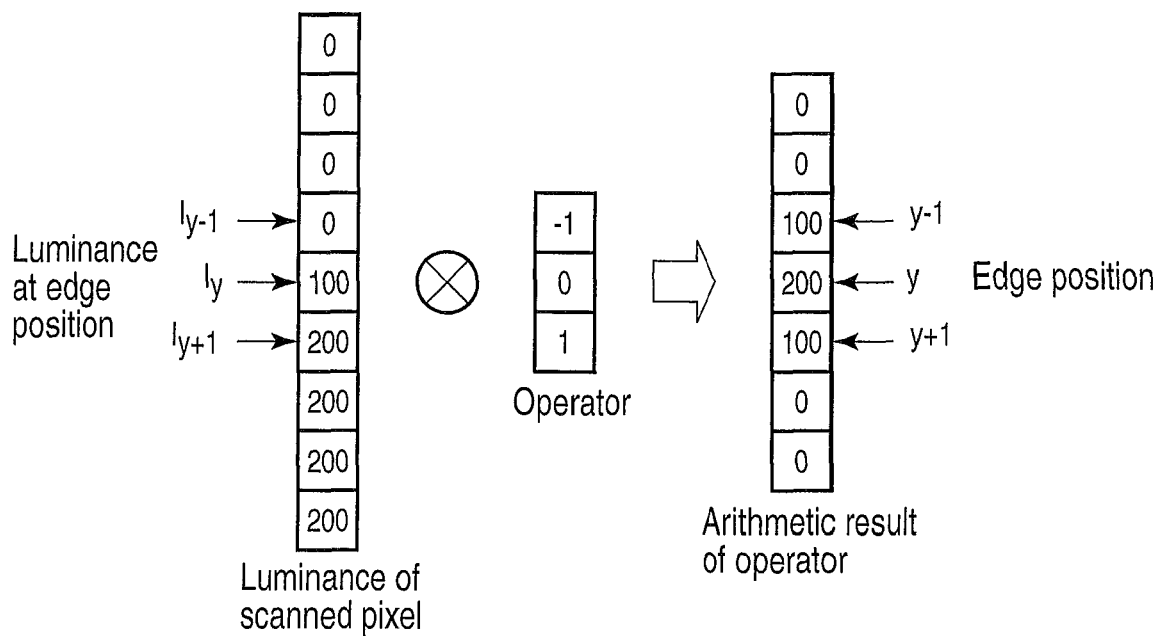
FIG. 3 is a view showing an example of filtering processing in the edge position detection unit.

FIG. 3 shows an example of the filtering processing in the edge position detection unit 2. Assume that the image is scanned downward in the vertical direction, and the luminance value of a background part outside the printed material A is "0", that of the printed material A is "200", and that of a pixel at their boundary is "100", for the sake of simplicity. Since a largest value (200) is obtained by arithmetic operations with the operator when the central position of the operator is located at the position of the boundary pixel, that position is represented by y, and a luminance value $I_y$ at the position y is "100".

The neighboring luminance sampling unit 3 samples luminance values at the edge position y obtained by the edge position detection unit 2 and its neighboring positions (luminance values of a plurality of pixels including the edge position y). In this embodiment, positions (y−1) and (y+1) are selected as neighboring positions of the edge position y, and let $I_{y-1}$, $I_y$, and $I_{y+1}$ be luminance values at these positions, respectively. This process will be described also using FIG. 3. As shown in FIG. 3, the luminance values $I_{y-1}$, $I_y$, and $I_{y+1}$ are respectively "0", "100", and "200".

The edge true position estimation unit 4 estimates a true edge position from the luminance values $I_{-1}$, $I_y$, and $I_{y+1}$ obtained by the neighboring luminance sampling unit 3. Assume that $I_{y+1} > I_y \geq I_{y-1}$. At this time, the edge true position estimation unit 4 estimates a true edge position y* by:

$$y^* = y - \frac{I_y - I_{y-1}}{I_{y+1} - I_{y-1}} + 0.5$$

In this example of FIG. 3, since $I_y$=100, $I_{y-1}$=0, and $I_{y+1}$=200, we have:

$$y^* = y - \frac{100 - 0}{200 - 0} + 0.5 = y$$

FIGS. 4A to 4C show, as other example, cases in which $I_y$ is "0", "50", and "150" ($I_{y-1}$ and $I_{y+1}$ are respectively "0" and "200"). In the example of FIG. 4A, since $I_y$=0, $I_{y-1}$=0, and $I_{y+1}$=200, we have:

$$y^* = y - \frac{0 - 0}{200 - 0} + 0.5 = y + 0.5$$

In the example of FIG. 4B, since $I_y$=50, $I_{y-1}$=0, and $I_{y+1}$=200, we have:

$$y^* = y - \frac{50 - 0}{200 - 0} + 0.5 = y + 0.25$$

In the example of FIG. 4C, since $I_y$=150, $I_{y-1}$=0, and $I_{y+1}$=200, we have:

$$y^* = y - \frac{150 - 0}{200 - 0} + 0.5 = y - 0.25$$

The edge position abnormal value removing unit 5 removes an abnormal value from the sequence of true edge positions obtained by the edge true position estimation unit 4 if such abnormal value is detected. In this case, if the true edge positions of a scan line of interest and two neighboring scan lines have differences of "two or more pixels", the true edge position obtained from the scan line of interest is removed (invalidated) as an abnormal value. This is based on a determination result that when true edge positions on scan lines that neighbor at one-pixel pitches have differences of two or more pixels, such position assumes an abnormal value which is impossible even in consideration of rotation.

The rotation angle calculation unit 6 calculates a rotation angle from the sequence of true edge positions selected via the edge position abnormal value removing unit 5. In this embodiment, for example, the rotation angle calculation unit 6 executes linear regression of the true edge position, and calculates a rotation angle from the slope of that regression line.

Figure 5:
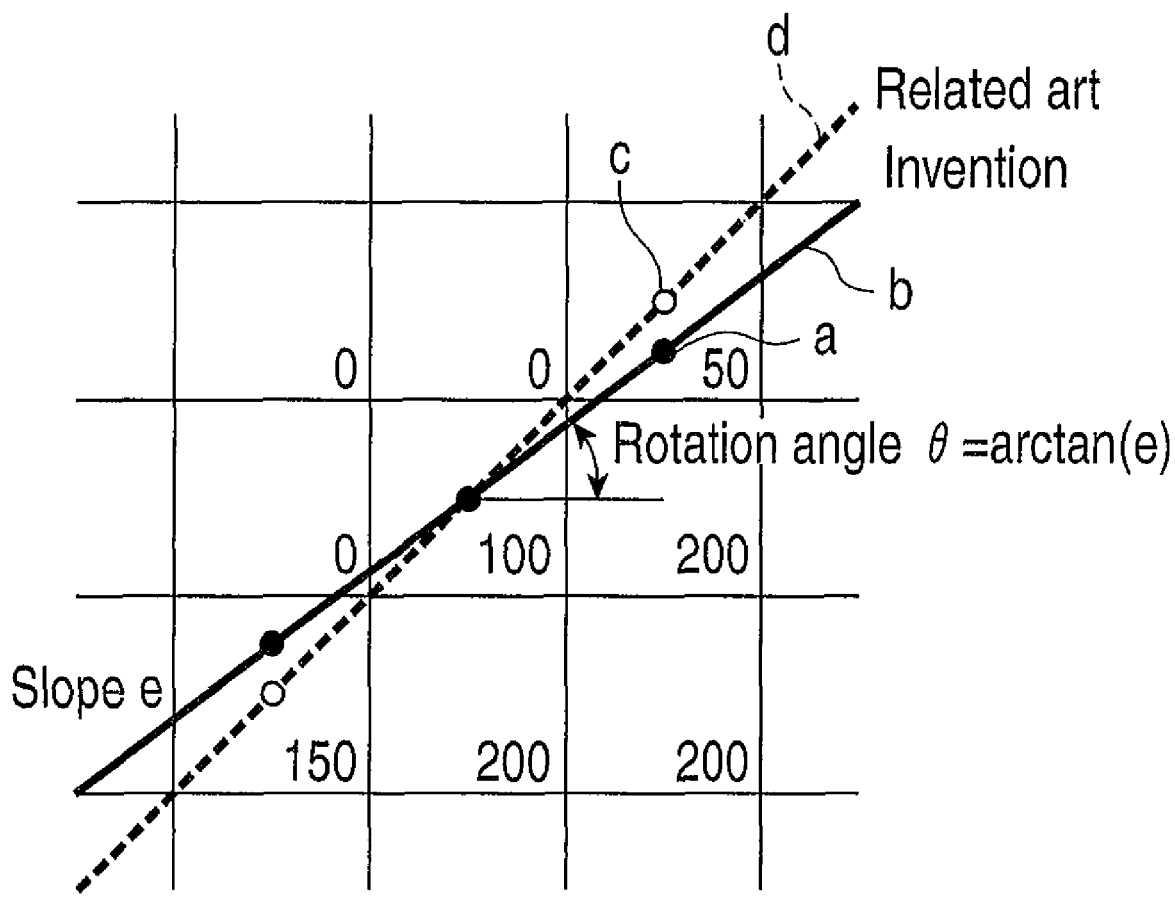
FIG. 5 is a view for explaining a rotation angle calculation in a rotation angle calculation unit.

FIG. 5 is an explanatory view of the rotation angle calculation in the rotation angle calculation unit 6. A region including 3×3 pixels will be examined for the sake of simplicity. Numerals in FIG. 5 are luminance values of respective pixels. A regression line (solid line in FIG. 5) b is calculated from true edge positions (full dots in FIG. 5) a estimated for respective scan lines by regression analysis. Note that with the conventional method, in such case, since edge positions are obtained for respective pixel pitches (open dots c in FIG. 5), a regression line d indicated by the dotted line in FIG. 5 is obtained.

As has already been described above, in the invention, since true edge positions are estimated based on luminance values of pixels, a regression line with a higher precision can be obtained. Letting e be the slope of the regression line, a rotation angle θ is calculated by:

$$\theta = \arctan(e)$$

The target rotation conversion unit 8 applies rotation correction (rotation conversion) to a plurality of targets (printed patterns) registered in advance in the database 7 for the respective printing plates of the printed material A in accordance with the rotation angle calculated by the rotation angle calculation unit 6. Note that each target registered in the database 7 indicates a particularly characteristic part on the printed surface of the printed material A (for example, a part including an abrupt density change), and is selected in the judgment of a person or automatically based on a predetermined measure.

FIG. 6 is an explanatory view of target rotation conversion in the target rotation conversion unit 8. Characteristic parts of the printed material A, e.g., characteristic patterns 21, 22, and 23 which exist on three corners in the example of FIG. 6, are extracted, and these extracted patterns 21, 22, and 23 are registered as targets in the database 7 together with information of the extracted positions.

The target rotation conversion unit 8 loads these targets 21, 22, and 23 registered in the database 7, and applies rotation conversion to these targets in accordance with the rotation angle θ obtained by the rotation angle calculation unit 6 so as to obtain the best results in the subsequent target matching process.

The target position detection unit 9 detects positions with maximum matching similarities in the input image in correspondence with the targets 21, 22, and 23 which have undergone the rotation conversion in the target rotation conversion unit 8.

Figure 7:
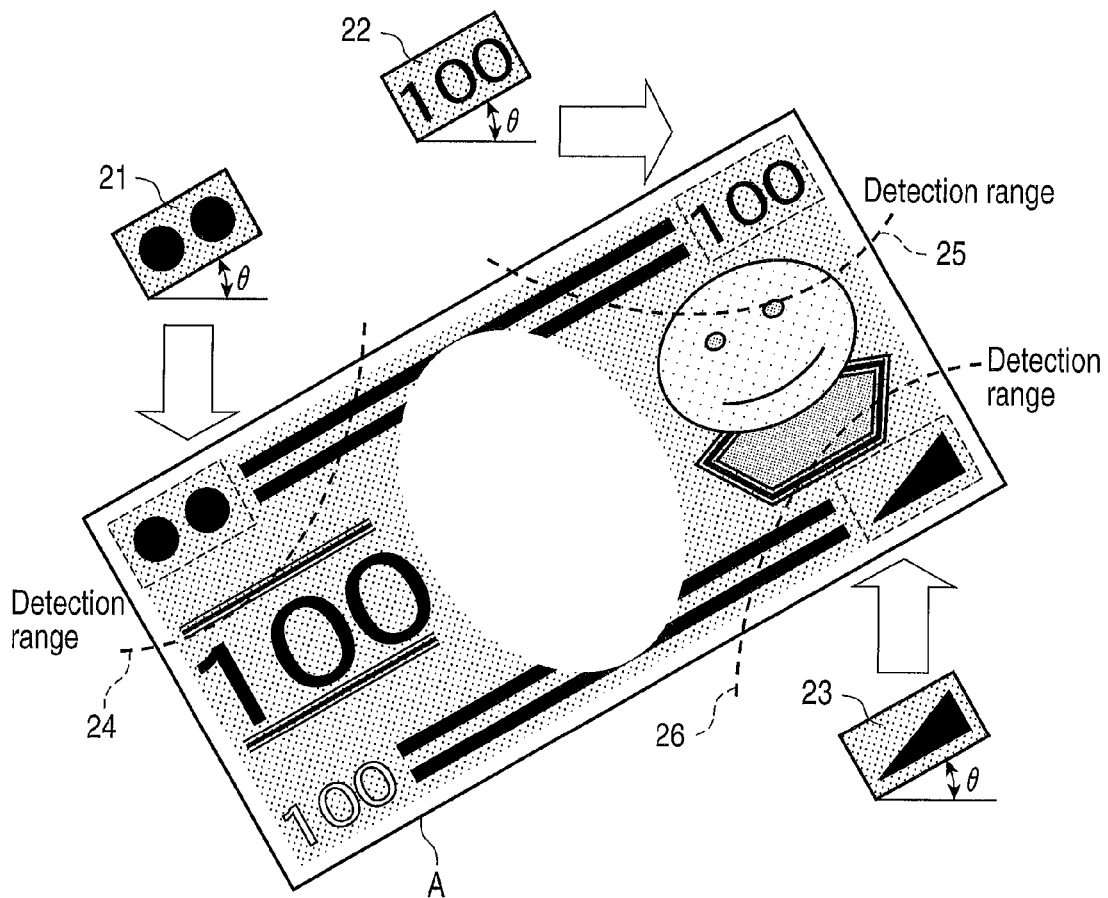
FIG. 7 is a view for explaining target position detection in a target position detection unit.

FIG. 7 is an explanatory view of the target position detection in the target position detection unit 9. Based on the pieces of position information of the targets 21, 22, and 23 that have undergone the rotation conversion, similarities between the targets 21, 22, and 23 and images of corresponding local regions of the printed material A in the input image are calculated by matching them, and positions p where the calculated similarities become maximum are respectively detected.

Note that predetermined range limitations having reference positions as the centers are set for the respective targets 21, 22, and 23 for the purpose of speeding up and stabilization of the processes. In FIG. 7, ranges of broken lines 24, 25, and 26 are set as detection ranges at the three corners of the printed material A.

The neighboring matching similarity calculation unit 10 calculates matching similarities (a plurality of matching similarities with a plurality of neighboring positions that neighbor each matching similarity maximum position p) near the matching similarity maximum positions p detected by the target position detection unit 9.

Figure 8:
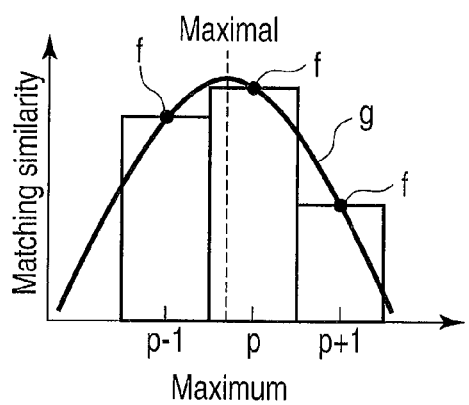
FIG. 8 is a view for explaining a neighboring matching similarity calculation in a neighboring matching similarity calculation unit.

FIG. 8 is an explanatory view of the neighboring matching similarity calculations in the neighboring matching similarity calculation unit 10. In this case, positions p±1 are assumed as neighbors (neighboring positions). The neighboring matching similarity calculation unit 10 calculates matching similarities at the positions p±1. In FIG. 8, full dots f indicate the calculated similarities.

The function approximation unit 11 applies function approximation using a curve or curved surface to gradients of the matching similarities at the matching similarity maximum positions p and their neighboring positions p±1, which are obtained by the neighboring matching similarity calculation unit 10. This process will be described also using FIG. 8. In this case, the gradient is approximated by a parabola g that passes through a total of three points at the position p and the neighboring positions p±1. In this case, the parabola g that passes through the three points f is uniquely determined.

The target true position estimation unit 12 calculates a position that yields a maximal value of the approximation function obtained by the function approximation unit 11 at a high precision of a pixel pitch or less, and determines that position as a true position. This process will be described also using FIG. 8.

As shown in FIG. 8, the matching similarity at the position p is surely maximum in pixel pitch units. However, a position that yields a maximal value of the parabola g obtained by the function approximation unit 11 does not always match the position p. Hence, the target true position estimation unit 12 determines this position that yields the maximal value as a target true position p*.

The alignment unit 13 aligns the input image and dictionary information registered in advance based on the target true positions obtained by the target true position estimation unit 12.

Figure 9:
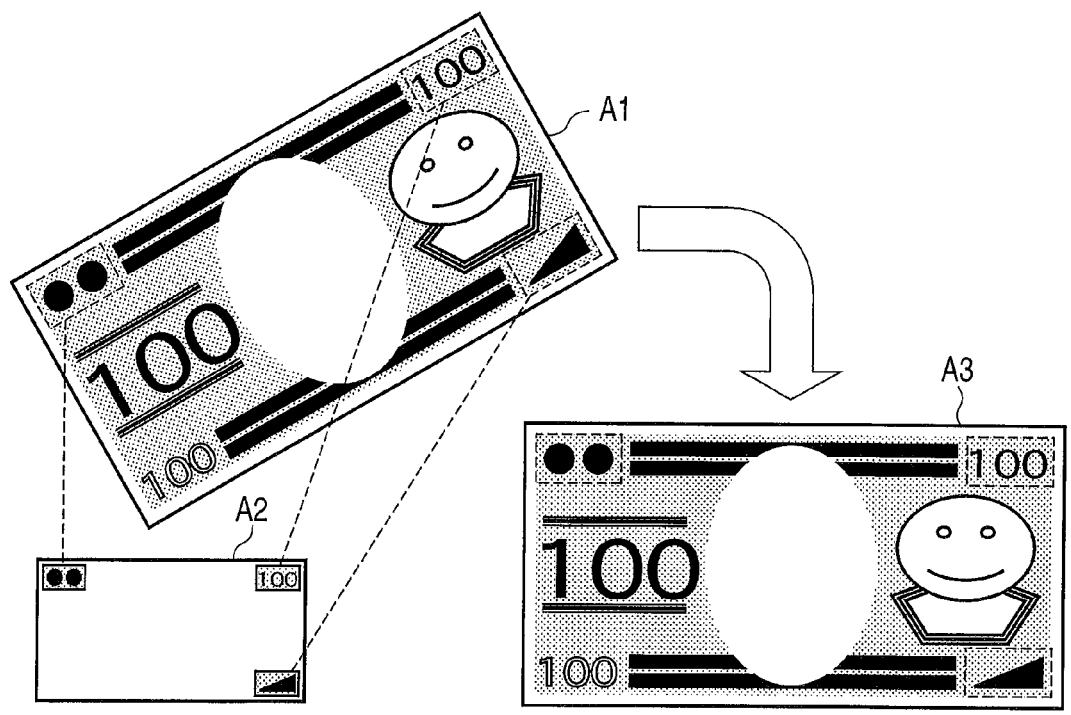
FIG. 9 is a view for explaining alignment in an alignment unit.

FIG. 9 is an explanatory view of alignment in the alignment unit 13. In this case, an input image A1 is affine-transformed (the affine transform is uniquely determined based on a three-point reference) using the three target true positions obtained by the target true position estimation unit 12. That is, the entire input image A1 is coordinate-transformed (deformed) so that a triangle that couples the three target true positions overlaps a corresponding triangle on a coordinate system normalized in dictionary information A2. As a result, an input image A3 after alignment that normalizes the position and size of the input image A1 at a precision finer than a pixel pitch can be obtained.

The mask filter processing unit 14 separates printed components of corresponding plates using mask filters, which are registered in advance in correspondence with printing plates of the printed material A, from the input image A3 aligned by the alignment unit 13.

Figure 10:
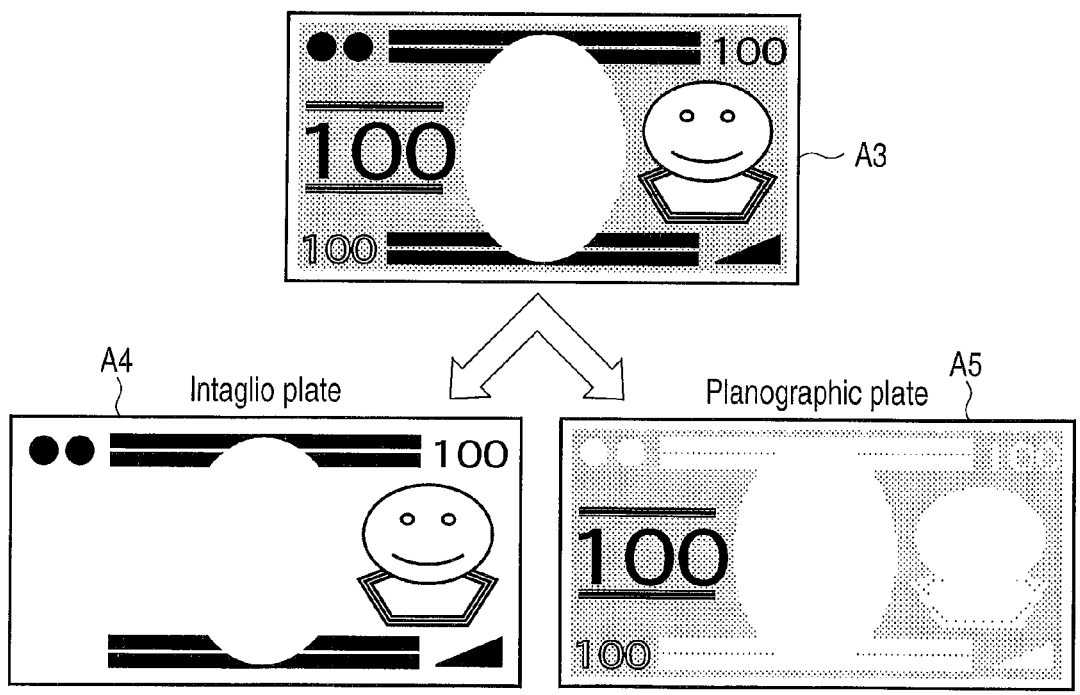
FIG. 10 is a view for explaining mask filter processing in a mask filter processing unit.

FIG. 10 is an explanatory view of mask filter processing in the mask filter processing unit 14. FIG. 10 shows a state in which the printed components of the printed material A are separated into two components, i.e., a printed component A4 of an intaglio plate and a printed component A5 of a planographic plate.

The defacement feature extraction unit 15 extracts defacement features suited to the respective printing plates of the printed material A. For example, as for the printed component A4 of the intaglio plate, since a density is expressed by an ink amount, a density contrast is extracted as a feature of defacement (ink blurring). As for the printed component A5 of the planographic plate, differences between density sampling values and a predetermined reference value are extracted as features of defacement (discoloration, color degradation, stain).

The defacement degree determination unit 16 determines a defacement degree by integrating the defacement features for the respective printing plates of the printed material A. As an integration method, various methods such as a method of simply making weighted additions and a method using a nonlinear system (neural network) described in Japanese Patent Application No. 2007-42292 are applicable.

The graffiti detection unit 17 detects graffiti of a specific part including at least one of a portrait and face value on the planographic plate. As a graffiti detection method, an average luminance value of the entire specific part may be used to detect the graffiti. However, according to this embodiment, since high-precision alignment is attained, luminance values of a finer region or for respective pixels can be directly used in detection and determination, and graffiti detection with higher precision can be expected.

The result output unit 18 outputs the determination result of the defacement degree determination unit 16 and the detection result of the graffiti detection unit 17 to a device such as a display device or storage device.

Figure 11:
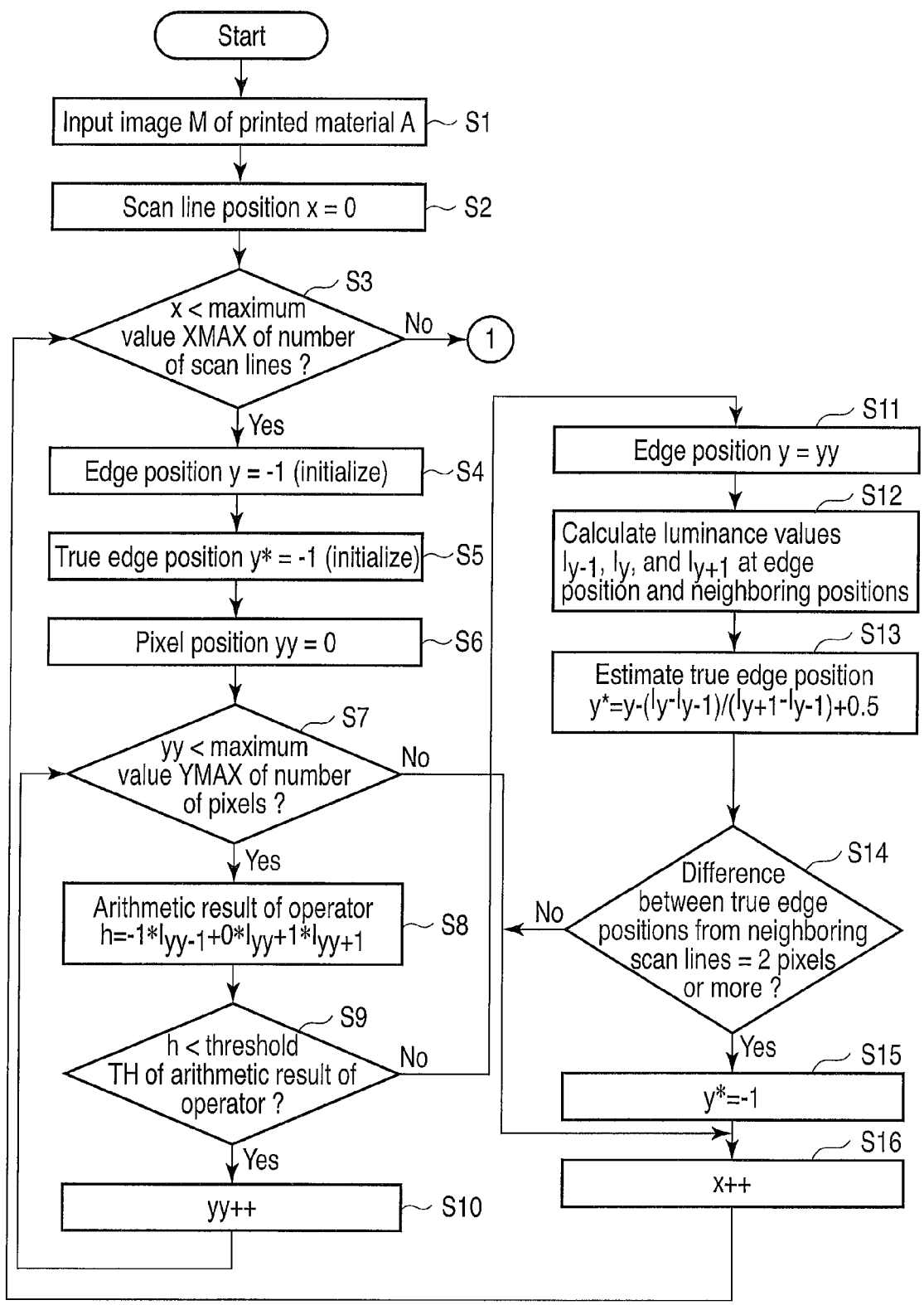
FIG. 11 is a flowchart for explaining the overall operation.
Figure 12:
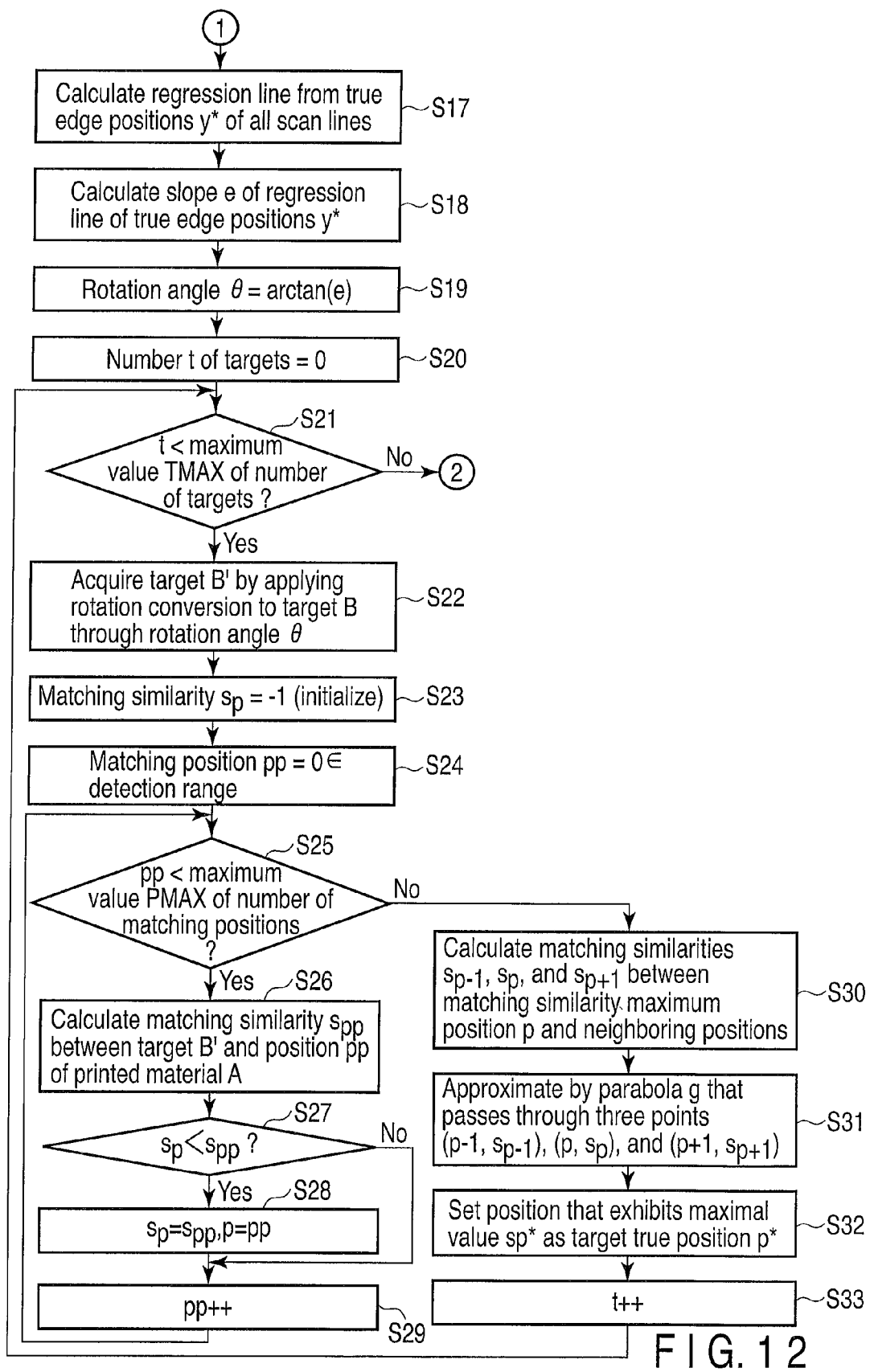
FIG. 12 is a flowchart for explaining the overall operation.
Figure 13:
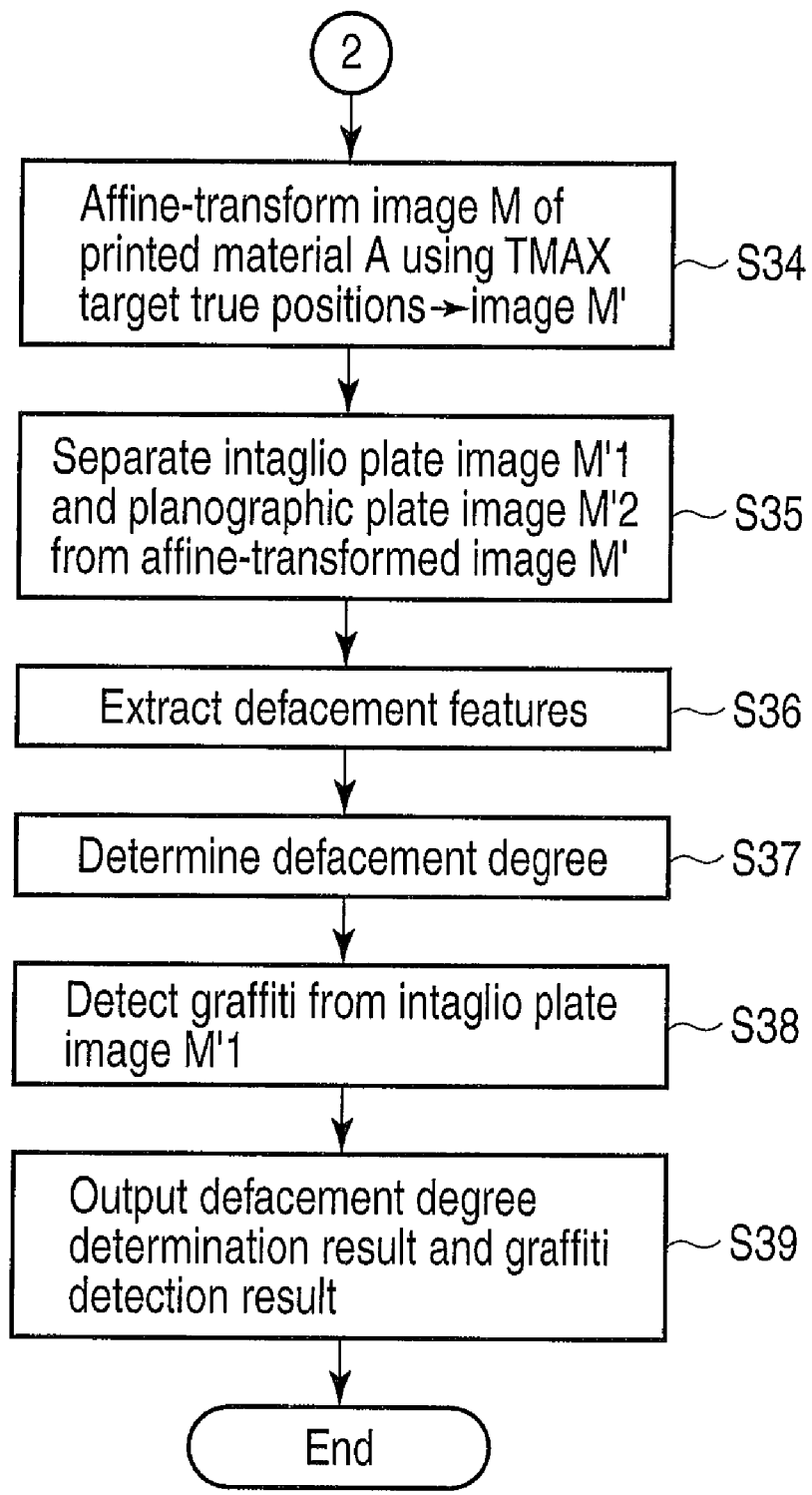
FIG. 13 is a flowchart for explaining the overall operation.

The overall operation in the aforementioned arrangement will be described below with reference to the flowcharts shown in FIGS. 11 to 13.

The image input unit 1 inputs a two-dimensional image M of the printed material A (step S1). The edge position detection unit 2 detects edge positions of the printed material A using luminance differences between pixels on the image M input by the image input unit 1 (steps S2 to S10).

That is, the edge position detection unit 2 initializes a scan line position x of the one-dimensional differential filter to "0" (step S2), and then checks if the scan line position x is smaller than a predetermined maximum value XMAX of the number of scan lines (step S3). If the scan line position x is smaller than the maximum value XMAX of the number of scan lines, the edge position detection unit 2 initializes an edge position y and true edge position y* to "−1", respectively (steps S4 and S5), and also initializes a pixel position yy to "0" (step S6).

The edge position detection unit 2 then checks if the pixel position yy is smaller than a predetermined maximum value YMAX of the number of pixels (step S7). If the pixel position yy is smaller than the maximum value YMAX of the number of pixels, the edge position detection unit 2 calculates an arithmetic result h of the operator (step S8) by:

$$h = -1 * I_{yy-1} + 0 * I_{yy} + 1 * I_{yy+1}$$

The edge position detection unit 2 checks if the calculated arithmetic result h is smaller than a threshold TH of the predetermined arithmetic result of the operator (step S9). If the arithmetic result h is smaller than the threshold TH, the edge position detection unit 2 increments the pixel position yy (step S10). After that, the process returns to step S7 to repeat the similar operation described above.

The neighboring luminance sampling unit 3 samples luminance values at each edge position y obtained by the edge position detection unit 2 and its neighboring positions y−1 and y+1 (steps S11 and S12).

That is, the neighboring luminance sampling unit 3 sets each edge position y obtained by the edge position detection unit 2 in the pixel position yy (step S11), and then obtains luminance values $I_{y-1}$, $I_y$, and $I_{y+1}$ at the edge position y and neighboring positions y−1 and y+1 (step S12).

The edge true position estimation unit 4 then estimates a true edge position y* from the luminance values $I_{y-1}$, $I_y$, and $I_{y+1}$ obtained by the neighboring luminance sampling unit 3 according to equation (1) above (step S13).

The edge position abnormal value removing unit 5 removes an abnormal value from a sequence of the true edge positions y* obtained by the edge true position estimation unit 4 if such value is detected (steps S14 to S16).

That is, the edge position abnormal value removing unit 5 checks if the true edge positions of the scan line of interest and the neighboring scan lines have a difference of two or more pixels (step S14). If the difference is two or more pixels, the edge position abnormal value removing unit 5 sets the true edge position y* to be "−1" (step S15). After that, the edge position abnormal value removing unit 5 increments the scan line position x by one (step S16), and the process returns to step S3 to repeat the same operation.

If the pixel position yy is larger than the maximum value YMAX of the number of pixels as a result of checking in step S7 or if the difference is not two or more pixels as a result of checking in step S14, the process skips step S15 and advances to step S16, thus repeating the same operation as described above.

As a result of checking in step S3, if the scan line position x is larger than the maximum value XMAX of the number of scan lines, the rotation angle calculation unit 6 calculates a rotation angle from the sequence of the true edge positions y* selected via the edge position abnormal value removing unit 5 (steps S17 to S19).

That is, the rotation angle calculation unit 6 calculates a regression line (solid line b in FIG. 5) by regression analysis from the true edge positions y* (full dots a in FIG. 5) of all the scan lines (step S17). Next, the rotation angle calculation unit 6 calculates a slope e (see FIG. 5) of the true edge positions y* (step S18), and then calculates a rotation angle θ (see FIG. 5) by the above equation (step S19).

Next, the target rotation conversion unit 8 applies rotation conversion to a plurality of targets, which are registered in advance in the database 7 in correspondence with the respective printing plates of the printed material A, in accordance with the rotation angle θ calculated in step S19 (steps S20 to S22).

That is, the target rotation conversion unit 8 initializes the number t of targets to "0" (step S20), and checks if the number t of targets is smaller than a predetermined maximum value TMAX of the number of targets (step S21). If the number t of targets is smaller than the maximum value TMAX of the number of targets, the target rotation conversion unit 8 acquires a target B' obtained by applying rotation conversion to a target B through the rotation angle θ (step S22).

The target position detection unit 9 detects a position where a matching similarity becomes maximum in the input image M in association with the target B' (target 21, 22, or 23 in FIG. 7) that has undergone the rotation conversion by the target rotation conversion unit 8 (steps S23 to S29).

That is, the target position detection unit 9 initializes a matching similarity $S_p$ to "−1" (step S23), and initializes a matching position pp to "0" in each of the aforementioned detection ranges 24, 25, and 26 (see FIG. 7) (step S24). The target position detection unit 9 then checks if the matching position pp is smaller than a predetermined maximum value PMAX of the number of matching positions (step S25). If the matching position pp is smaller than the maximum value PMAX of the number of matching positions, the target position detection unit 9 calculates a matching similarity $S_{pp}$ between the target B' and the matching position pp of the printed material A (step S26).

The target position detection unit 9 then checks if the calculated matching similarity $S_{pp}$ is larger than the matching similarity $S_p$ (step S27). If the matching similarity $S_{pp}$ is larger than the matching similarity $S_p$, the target position detection unit 9 sets the matching similarity $S_{pp}$ in the matching similarity $S_p$, and sets the matching position pp in the similarity maximum position p (step S28). After that, the target position detection unit 9 increments the matching position pp by one (step S29), and the process returns to step S25 to repeat the same operation as described above.

As a result of checking in step S27, if the matching similarity $S_{pp}$ is smaller than the matching similarity $S_p$, the process skips step S28 and advances to step S29, thus repeating the same operation as described above.

As a result of checking in step S25, if the matching position pp is larger than the maximum value PMAX of the number of matching positions, the neighboring matching similarity calculation unit 10 calculates matching similarities $S_{p-1}$, $S_p$, and $S_{p+1}$ at the matching similarity maximum position p detected by the target position detection unit 9 and neighboring positions p−1 and p+1 (step S30).

The function approximation unit 11 approximates a gradient of the matching similarities at the matching similarity maximum position p and neighboring positions p−1 and p+1 by a parabola g that passes through three points (p−1, $S_{p-1}$), (p, $S_p$), and (p+1, $S_{p+1}$), as shown in FIG. 8 (step S31).

The target true position estimation unit 12 sets a position that yields a maximal value $S_{p*}$ of the approximation function obtained by the function approximation unit 11 as a target true position p* (step S32), and then increments the number t of targets by one (step S33). The process then returns to step S21 to repeat the same operation as described above.

As a result of checking in step S21, if the number t of targets is larger than the maximum value TMAX of the number of targets, the alignment unit 13 affine-transforms the input image M (corresponding to the input image A1 in FIG. 9) of the printed material A using the t target true positions obtained by the target true position estimation unit 12 to acquire a transformed input image M' (corresponding to the input image A3 in FIG. 9) (step S34).

The mask filter processing unit 14 separates an intaglio plate image M'1 (corresponding to the printed component A4 of the intaglio plate in FIG. 10) and a planographic plate image M'2 (corresponding to the printed component A5 of the planographic plate in FIG. 10) from the input image M' (corresponding to the input image A3 in FIG. 10) affine-transformed by the alignment unit 13 (step S35).

The defacement feature extraction unit 15 extracts defacement features suited to the respective printing plates of the printed material A (step S36). For example, as for the intaglio plate image M'1, the defacement feature extraction unit 15 extracts a density contrast as a defacement feature. As for the planographic plate image M'2, the defacement feature extraction unit 15 extracts differences between the density sampling values and reference value as a defacement feature.

The defacement degree determination unit 16 determines a defacement degree by integrating the defacement features for the respective printing plates of the printed material A (step S37). The graffiti detection unit 17 detects graffiti from the intaglio plate image M'1 (step S38). The result output unit 18 then outputs the determination result of the defacement degree determination unit 16 and the detection result of the graffiti detection unit 17 (step S39).

As described above, according to this embodiment, upon determining a defacement degree of a printed material, processes suited to respective printing plates can be done since the printed patterns of the printed material are separated into printed components for the respective printing plates, thus allowing defacement degree determination with a higher precision.

Note that the invention is not limited to the aforementioned embodiment, and can be modified to various modes when it is practiced. For example, in case of target matching, distance criteria may be used in place of similarities of two pieces of information. In this case, the maximum and maximal similarities are replaced by minimum and minimal distances and so forth.

The wavelength range of the sensing device used in the image input unit is not limited to visible light. For example, the sensing device may use infrared light (IR) or a combination of visible light and infrared light, and various embodiments are available. Defacement degree determination using a combination of visible light and infrared light will be described in detail below.

Figure 14:
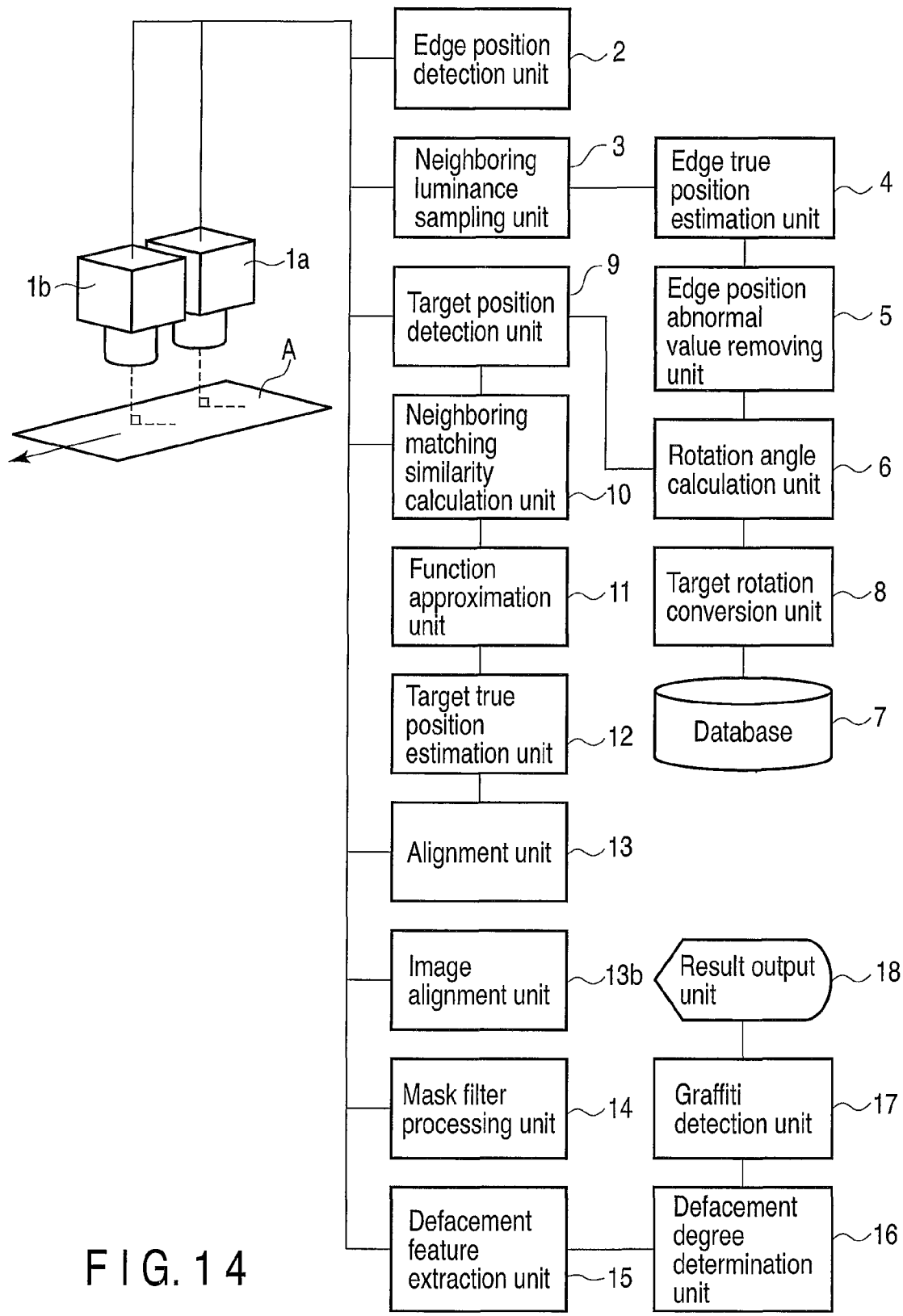
FIG. 14 is a schematic block diagram showing the arrangement of a defacement degree determination apparatus of a printed material according to the second embodiment of the invention.

The second embodiment of the invention will be described below with reference to the drawings. FIG. 14 schematically shows the arrangement of a defacement degree determination apparatus of a printed material according to the second embodiment of the invention. This defacement degree determination apparatus of a printed material uses sensing devices (cameras or image sensors) of different wavelength ranges, as described above. For example, this defacement degree determination apparatus of a printed material includes image input units 1a and 1b. The image input unit 1a is a visible light image input unit, and the image input unit 1b is an infrared light image input unit. Furthermore, this defacement degree determination apparatus of a printed material includes an image alignment unit 13b, which aligns the positions of an image input by the image input unit 1a and that input by the image input unit 1b. Other components are basically the same as those of the defacement degree determination apparatus of a printed material shown in FIG. 1, and a detailed description thereof will not be repeated.

This defacement degree determination apparatus of a printed material can acquire two different types of input images from an identical printed material using the image input units 1a and 1b, and can determine defacement degrees and detect graffiti from these two different types of input images. Details of the defacement degree determination and graffiti detection are as have already been described above. When the image input unit 1b is an infrared light image input unit, mask filter processing for an input image from the image input unit 1b is skipped. The image alignment unit 13b aligns the positions of the two different types of input images. That is, the image alignment unit 13b aligns the positions of the two different types of input images normalized by the alignment unit 13 using the results of target true positions estimated by the target true position estimation unit 12. That is, the image alignment unit 13b associates the respective target true positions on one input image with those on the other input image to align the positions of these two input images. As has already been described above, the positional precision of each target true position is very high. For this reason, the two input images can be aligned with a high precision.

As a result, this defacement degree determination apparatus of a printed material can determine a final defacement degree by comprehensively examining the two defacement degree determination results obtained from these two input images, and can detect a final graffiti detection result by comprehensively examining the two graffiti detection results obtained from these two input images. That is, this defacement degree determination apparatus of a printed material can output a high-precision defacement degree determination result, and can output a high-precision graffiti detection result.

This defacement degree determination apparatus of a printed material will be described in more detail below. For example, the image input unit 1a (visible light image input unit) inputs input images of R (Red), G (Green), and B (Blue) components. The defacement degree determination apparatus applies rotation angle detection, alignment, plate separation processing, and the like to these input images of the R, G, and B components. For example, the mask filter processing unit 14 applies mask filter processing to the input images of the R, G, and B components. That is, the mask filter processing unit 14 obtains a first printed component corresponding to an intaglio plate separated from the input image of the R component, a second printed component corresponding to a planographic plate separated from the input image of the R component, a third printed component corresponding to the intaglio plate separated from the input image of the G component, a fourth printed component corresponding to the planographic plate separated from the input image of the G component, a fifth printed component corresponding to the intaglio plate separated from the input image of the B component, and a sixth printed component corresponding to the planographic plate separated from the input image of the B component.

For example, the defacement feature extraction unit 15 extracts first, third, and fifth defacement features from the first, third, and fifth printed components based on contrast, and extracts second, fourth, and sixth defacement features from the second, fourth, and sixth printed components based on color tone. The defacement degree determination unit 16 determines a defacement degree of the input image of the R component based on the first and second defacement features. For example, the defacement degree determination unit 16 evaluates a defacement degree based on the first defacement feature in five grades, evaluates a defacement degree based on the second defacement feature in five grades, and sets an average value of the defacement degrees based on the first and second defacement features as a defacement degree of the input image of the R component. Likewise, the defacement degree determination unit 16 determines a defacement degree of the input image of the G component based on the third and fourth defacement features, and determines that of the input image of the B component based on the fifth and sixth defacement features.

The graffiti detection unit 17 detects graffiti from the first, third, and fifth printed components, determines a graffiti degree of the input image of the R component based on the graffiti detected from the first printed component, determines a graffiti degree of the input image of the G component based on the graffiti detected from the third printed component, and determines a graffiti degree of the input image of the B component based on the graffiti detected from the fifth printed component.

Furthermore, the defacement feature extraction unit 15 and defacement degree determination unit 16 also extract defacement features from the input image input by the image input unit 1b (infrared light image input unit), and determine a defacement degree. The graffiti detection unit 17 also detects graffiti from the input image input by the image input unit 1b, and determines a graffiti degree.

As described above, the defacement degree and graffiti degree of the printed material can be comprehensively evaluated based on the defacement degree determination results and graffiti degree determination results for the input images (those of the R, C, and B components) input by the image input unit 1b, and those for the input image input by the image input unit 1b.

As described above, since a defacement degree can be determined for each input image, and graffiti can be determined for each input image, the printed material can be evaluated with a high precision. As a result, for example, in a situation in which a printed material is to be strictly evaluated, by setting a low reference value of defacement degree determination which can be set in the defacement degree determination unit 16, the defacement degree determination apparatus can obtain a determination result of the presence of defacement upon inspecting a slightly defaced printed material. Likewise, by setting a low reference of graffiti determination that can be set in the graffiti detection unit 17, the defacement degree determination apparatus can obtain a determination result of the presence of graffiti upon inspecting a printed material with slight graffiti. Conversely, in a situation in which a printed material is to be evaluated not strictly, by setting a high reference value of defacement degree determination which can be set in the defacement degree determination unit 16, the defacement degree determination apparatus can obtain a determination result of the absence of defacement upon inspecting a slightly defaced printed material. Likewise, by setting a high reference of graffiti determination that can be set in the graffiti detection unit 17, the defacement degree determination apparatus can obtain a determination result of the absence of graffiti upon inspecting a printed material with slight graffiti.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A defacement degree determination apparatus comprising:
    an image input unit configured to input an image of a printed material;
    a rotation angle detection unit configured to detect a rotation angle of the printed material with respect to a reference position based on the input image input by the image input unit;
    an alignment unit configured to align positions of the input image printed using a plurality of printing plates with registered images registered in advance;
    a target rotation conversion unit configured to apply rotation conversion to a plurality of printed patterns registered in correspondence with the plurality of printing plates in accordance with the rotation angle;
    a target position detection unit configured to detect, from the input image, a plurality of matching similarity maximum positions where matching similarities with the respective rotated printed patterns become maximum in correspondence with the plurality of printing plates;
    a matching similarity calculation unit configured to calculate a plurality of matching similarities between the respective rotated printed patterns and the respective matching similarity maximum positions, and a plurality of matching similarities between the respective rotated printed patterns and a plurality of neighboring positions that neighbor the respective matching similarity maximum positions in correspondence with the plurality of printing plates;

a function approximation unit configured to approximate, by a function, a gradient of the plurality of matching similarities indicating matching similarity results with respect to an identical rotated printed pattern in correspondence with the plurality of printing plates; and a target true position estimation unit configured to estimate true positions of the respective rotated printed patterns corresponding to maximal values calculated by the approximation by the function in correspondence with the plurality of printing plates, a plate separation processing unit configured to separate the input image into a plurality of printed components corresponding to the plurality of printing plates, and extract defacement features from the respective printed components; and a defacement degree determination unit configured to determine a defacement degree of the printed material based on the defacement features extracted from the respective printed components, wherein the alignment unit aligns the positions of the input image and the registered images based on the true positions of the respective rotated printed patterns estimated by the target true position estimation unit in correspondence with the plurality of printing plates.

2. The apparatus according to claim 1, wherein the target position detection unit detects the plurality of matching similarity maximum positions where the matching similarities with the respective rotated printed patterns become maximum from predetermined ranges including reference positions of the input image in correspondence with the plurality of printing plates.

3. A defacement degree determination apparatus comprising:

an image input unit configured to input an image of a printed material printed;

an alignment unit configured to align positions of the input image from printed using a plurality of printing plates with registered images registered in advance;

a plate separation processing unit configured to separate the input image into a plurality of printed components corresponding to the plurality of printing plates, and extract defacement features from the respective printed components;

a rotation angle detection unit configured to detect a rotation angle of the printed material with respect to a reference position based on the input image input by the image input unit;

the rotation angle detection unit including:

an edge position detection unit configured to detect a plurality of edge positions of the printed material from the input image based on luminance differences between pixels that form the input image;

a luminance sampling unit configured to sample luminance values of a plurality of pixels including the plurality of edge positions detected by the edge position detection unit;

an edge true position estimation unit configured to estimate a plurality of edge true positions based on the plurality of edge positions detected by the edge position detection unit, and a gradient of the plurality of luminance values obtained by sampling by the luminance sampling unit; and a rotation angle calculation unit configured to calculate the rotation angle of the printed material based on a sequence of the plurality of edge true positions estimated by the edge true position estimation unit; and a defacement degree determination unit configured to determine a defacement degree of the printed material based on the defacement features extracted from the respective printed components;

wherein the alignment unit aligns the positions of the input image and the registered images in accordance with the rotation angle detected by the rotation angle detection unit.

4. The apparatus according to claim 3, wherein the rotation angle detection unit includes:

a edge position abnormal value removing unit configured to detect an edge true position that indicates an abnormal value from the sequence of the plurality of edge true positions estimated by the edge true position estimation unit, and remove the edge true position that indicates the abnormal value, and the rotation angle calculation unit calculates the rotation angle of the printed material from the sequence of the plurality of edge true positions, which do not include the edge true position that indicates the abnormal value removed by the edge position abnormal value removing unit.

5. A defacement degree determination apparatus comprising:

an image input unit configured to input an image of a printed material printed using a plurality of printing plates with registered images registered in advance;

an alignment unit configured to align positions of the input image;

a plate separation processing unit configured to separate the input image into a plurality of printed components corresponding to the plurality of printing plates, and extract defacement features from the respective printed components;

a rotation angle detection unit configured to detect a rotation angle of the printed material with respect to a reference position based on the input image input by the image input unit;

a target rotation conversion unit configured to apply rotation conversion to a plurality of printed patterns registered in correspondence with the plurality of printing plates in accordance with the rotation angle;

a target position detection unit configured to detect, from the input image, a plurality of distance minimum positions where distances from the respective rotated printed patterns become minimum in correspondence with the plurality of printing plates;

a distance calculation unit configured to calculate a plurality of distances between the respective rotated printed patterns and the respective distance minimum positions, and a plurality of distances between the respective rotated printed patterns and a plurality of neighboring positions that neighbor the respective distance minimum positions in correspondence with the plurality of printing plates;

a function approximation unit configured to approximate, by a function, a gradient of the plurality of distances indicating the distance calculation results with respect to an identical rotated printed pattern in correspondence with the plurality of printing plates; and a target true position estimation unit configured to estimate true positions of the respective rotated printed patterns corresponding to minimal values calculated by the approximation by the function in correspondence with the plurality of printing plates, and a defacement degree determination unit configured to determine a defacement degree of the printed material based on the defacement features extracted from the respective printed components;

wherein the alignment unit aligns the positions of the input image and the registered images based on the true positions of the respective rotated printed patterns estimated by the target true position estimation unit in correspondence with the plurality of printing plates.

6. The apparatus according to claim 5, wherein the target position detection unit detects the plurality of distance minimum positions where the distances from the respective rotated printed patterns become minimum from predetermined ranges including reference positions of the input image in correspondence with the plurality of printing plates.

7. A defacement degree determination method comprising:
inputting an image of a printed material printed;
detecting a rotation angle of the printed material with respect to a reference position based on the input image,
aligning the positions of the input image and the registered images in accordance with the detected rotation angle;
aligning positions of the input image using a plurality of printing plates with registered images registered in advance;
applying rotation conversion to the plurality of printed patterns registered in correspondence with the plurality of printing plates in accordance with the rotation angle;
detecting, from the input image, a plurality of matching similarity maximum positions where matching similarities with the respective rotated printed patterns become maximum in correspondence with the plurality of printing plates;
calculating a plurality of matching similarities between the respective rotated printed patterns and the respective matching similarity maximum positions, and a plurality of matching similarities between the respective rotated printed patterns and a plurality of neighboring positions that neighbor the respective matching similarity maximum positions in correspondence with the plurality of printing plates;
approximating, by a function, a gradient of the plurality of matching similarities indicating matching similarity results with respect to an identical rotated printed pattern in correspondence with the plurality of printing plates;
estimating true positions of the respective rotated printed patterns corresponding to maximal values calculated by the approximation by the function in correspondence with the plurality of printing plates;
aligning the positions of the input image and the registered images based on the estimated true positions of the respective rotated printed patterns in correspondence with the plurality of printing plates;
separating the input image into a plurality of printed components corresponding to the plurality of printing plates, and extracting defacement features from the respective printed components; and
determining a defacement degree of the printed material based on the defacement features extracted from the respective printed components.

8. A defacement degree determination method comprising:
inputting an image of a printed material printed;
detecting a rotation angle of the printed material with respect to a reference position based on the input image,
aligning the positions of the input image and the registered images in accordance with the detected rotation angle;
aligning positions of the input image using a plurality of printing plates with registered images registered in advance;
detecting a plurality of edge positions of the printed material from the input image based on luminance differences between pixels that form the input image;
sampling luminance values of a plurality of pixels including the plurality of detected edge positions;
estimating a plurality of edge true positions based on the plurality of detected edge positions, and a gradient of the plurality of sampled luminance values;
calculating the rotation angle of the printed material based on a sequence of the plurality of estimated edge true positions;
separating the input image into a plurality of printed components corresponding to the plurality of printing plates, and extracting defacement features from the respective printed components; and
determining a defacement degree of the printed material based on the defacement features extracted from the respective printed components.

* * * * *